US009261928B2

(12) United States Patent
Aruga et al.

(10) Patent No.: US 9,261,928 B2
(45) Date of Patent: Feb. 16, 2016

(54) ELECTRONIC DEVICE

(71) Applicant: Sony Corporation, Minato-ku (JP)

(72) Inventors: Sin Aruga, Nagano (JP); Atsushi Tani, Nagano (JP); Kenji Saitou, Nagano (JP); Akira Hanatsuka, Nagano (JP)

(73) Assignee: SONY CORPORATION, Tokyo (JP)

( * ) Notice: Subject to any disclaimer, the term of this patent is extended or adjusted under 35 U.S.C. 154(b) by 31 days.

(21) Appl. No.: 14/280,746

(22) Filed: May 19, 2014

(65) Prior Publication Data

US 2014/0355197 A1    Dec. 4, 2014

(30) Foreign Application Priority Data

May 28, 2013   (JP) ................................. 2013-112335

(51) Int. Cl.
*G06F 1/16*   (2006.01)
*G06F 1/20*   (2006.01)

(52) U.S. Cl.
CPC .............. *G06F 1/203* (2013.01); *G06F 1/1681* (2013.01); *G06F 1/1616* (2013.01); *G06F 1/1624* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,847,925 | A * | 12/1998 | Progl | ....................... | G06F 1/203 165/104.33 |
| 5,992,155 | A * | 11/1999 | Kobayashi | ............... | G06F 1/203 165/104.33 |
| 6,075,696 | A * | 6/2000 | Progl | ....................... | G06F 1/203 16/226 |
| 7,710,724 | B2 * | 5/2010 | Takeguchi | ............... | G06F 1/203 165/104.33 |
| 8,144,460 | B2 * | 3/2012 | Luo | .......................... | G06F 1/203 165/80.3 |
| 8,395,889 | B2 * | 3/2013 | Hata | ........................ | G06F 1/203 165/80.3 |
| 8,625,279 | B2 * | 1/2014 | Hata | ....................... | G06F 1/1658 165/104.33 |
| 8,743,541 | B2 * | 6/2014 | Hata | ................... | H05K 7/20972 165/80.4 |
| 8,976,528 | B2 * | 3/2015 | Degner | ...................... | G06F 1/20 165/104.26 |
| 2004/0042171 | A1 * | 3/2004 | Takamatsu | .............. | G06F 1/203 361/679.48 |
| 2004/0080908 | A1 * | 4/2004 | Wang | ...................... | G06F 1/203 361/679.47 |
| 2005/0280988 | A1 * | 12/2005 | Wyatt | ...................... | G06F 1/203 361/679.47 |
| 2007/0227705 | A1 * | 10/2007 | Hata | ...................... | G06F 1/1616 165/104.33 |
| 2008/0257529 | A1 * | 10/2008 | Fujiwara | ............... | F28D 15/046 165/104.14 |
| 2011/0205714 | A1 * | 8/2011 | Takakusaki | ........... | G06F 1/1616 361/748 |
| 2012/0186961 | A1 * | 7/2012 | Oike | ....................... | G06F 1/203 200/5 A |
| 2012/0261101 | A1 * | 10/2012 | Takahashi | ............... | G06F 1/203 165/104.34 |
| 2013/0279112 | A1 * | 10/2013 | Kim | ................... | H05K 7/20154 361/692 |
| 2013/0329357 | A1 * | 12/2013 | Degner | .................... | H05K 5/02 361/679.47 |

* cited by examiner

*Primary Examiner* — Lisa Lea Edmonds
(74) *Attorney, Agent, or Firm* — Oblon, McClelland, Maier & Neustadt, L.L.P.

(57) ABSTRACT

There is provided an electronic device including a flat-plate-like main unit including a keyboard, a flat-plate-like display unit which includes a display surface and is configured to move between a first state to be superimposed on the main unit and a second state to stand up from the first state, a hinge which connects the main unit and the display unit to each other in a manner that the display unit is movable with respect to the main unit, the hinge being provided in a center of the main unit in a left and right direction, a heat source and a cooling fan across the hinge in an inside of the main unit, and a heat pipe which connects the heat source and the cooling fan to each other and avoids an attaching portion of the hinge with respect to the main unit.

4 Claims, 22 Drawing Sheets

ELECTRONIC DEVICE

CROSS REFERENCE TO RELATED APPLICATIONS

This application claims the benefit of Japanese Priority Patent Application JP 2013-112335 filed May 28, 2013, the entire contents of which are incorporated herein by reference.

BACKGROUND

The present disclosure relates to an electronic device.

In the related art, JP 2009-230244A, for example, discloses a device including a main unit over which a keyboard for inputting information is provided and a display unit over which a display for displaying information is provided, the device being configured to slide and tilt up/tilt down the display unit with respect to the main unit by use of a slide mechanism and a tilt-up/tilt-down mechanism.

SUMMARY

However, the structure disclosed in JP 2009-230244A may strictly limit the space for the keyboard because two rotation fulcrums of the display unit with respect to the main unit are provided at the respective ends of the main unit in the width direction, and the rotation fulcrums are provided near the center of the main unit in the backward direction. Thus, a large space might not be secured especially in the backward direction of the device and only a very small keyboard might be mounted with respect to the size of the plane of the main unit. Accordingly, it has been difficult to arrange structural elements such as a touch pad and a palm rest in front of the keyboard.

Further, since slide guides (trenches) for sliding the display unit are formed at both ends of the main unit in the structure disclosed in JP 2009-230244A, the space of the main unit is decreased by the slide guides, which prevents further downsizing and thinning.

In order to secure as large a space as possible for the keyboard and to achieve downsizing and thinning of a device, the main unit and the display unit may be connected to each other with a hinge. However, in the case where such a structure is employed, there might be a severe limitation on the arrangement of structural elements because a space is necessary for storing the hinge when the display unit is folded. The limitation due to the space for storing the hinge will be severe especially in a thinned and downsized device. Thus, considering cooling of the main unit, it is not possible to dispose a heat source such as a CPU to be close to a cooling fan with respect to the hinge, which may result in a very low cooling efficiency.

In particular, in the case where the main unit and the display unit are connected to each other with a single hinge, it is assumed that the hinge is disposed at the center of the main unit in the width direction in order to hold the display unit firmly. In this case, in the state in which the display unit is folded, the space for storing the hinge is located near the center of the main unit in the width direction. Thus, the main unit may be divided into two parts by the space for storing the hinge, and accordingly, it would be difficult to dispose the heat source such as the CPU to be close to the cooling fan owing to the limitation on the space.

Accordingly, there has been a demand for efficient cooling of the heat source of the main unit in the structure in which the main unit and the display unit are connected to each other with a hinge.

According to an embodiment of the present disclosure, there is provided an electronic device including a flat-plate-like main unit including a keyboard, a flat-plate-like display unit which includes a display surface and is configured to move between a first state to be superimposed on the main unit and a second state to stand up from the first state, a hinge which connects the main unit and the display unit to each other in a manner that the display unit is movable with respect to the main unit, the hinge being provided in a center of the main unit in a left and right direction, a heat source and a cooling fan across the hinge in an inside of the main unit, and a heat pipe which connects the heat source and the cooling fan to each other and avoids an attaching portion of the hinge with respect to the main unit.

The heat pipe may be disposed more backward of the main unit than the attaching portion of the hinge, when seen from a front of the main unit.

The heat pipe may be disposed more forward of the main unit than the attaching portion of the hinge, when seen from a front of the main unit.

The cooling fan may be provided at a position that does not overlap with a position of a hand of a user holding the electronic device.

The cooling fan may be disposed at a right and backward position of the main unit, when seen from a front of the main unit.

According to one or more embodiments of the present disclosure, it becomes possible to efficiently cool the heat source of the main unit in the structure in which the main unit and the display unit are connected to each other with a hinge.

DETAILED DESCRIPTION OF THE EMBODIMENT(S)

Figure 1:
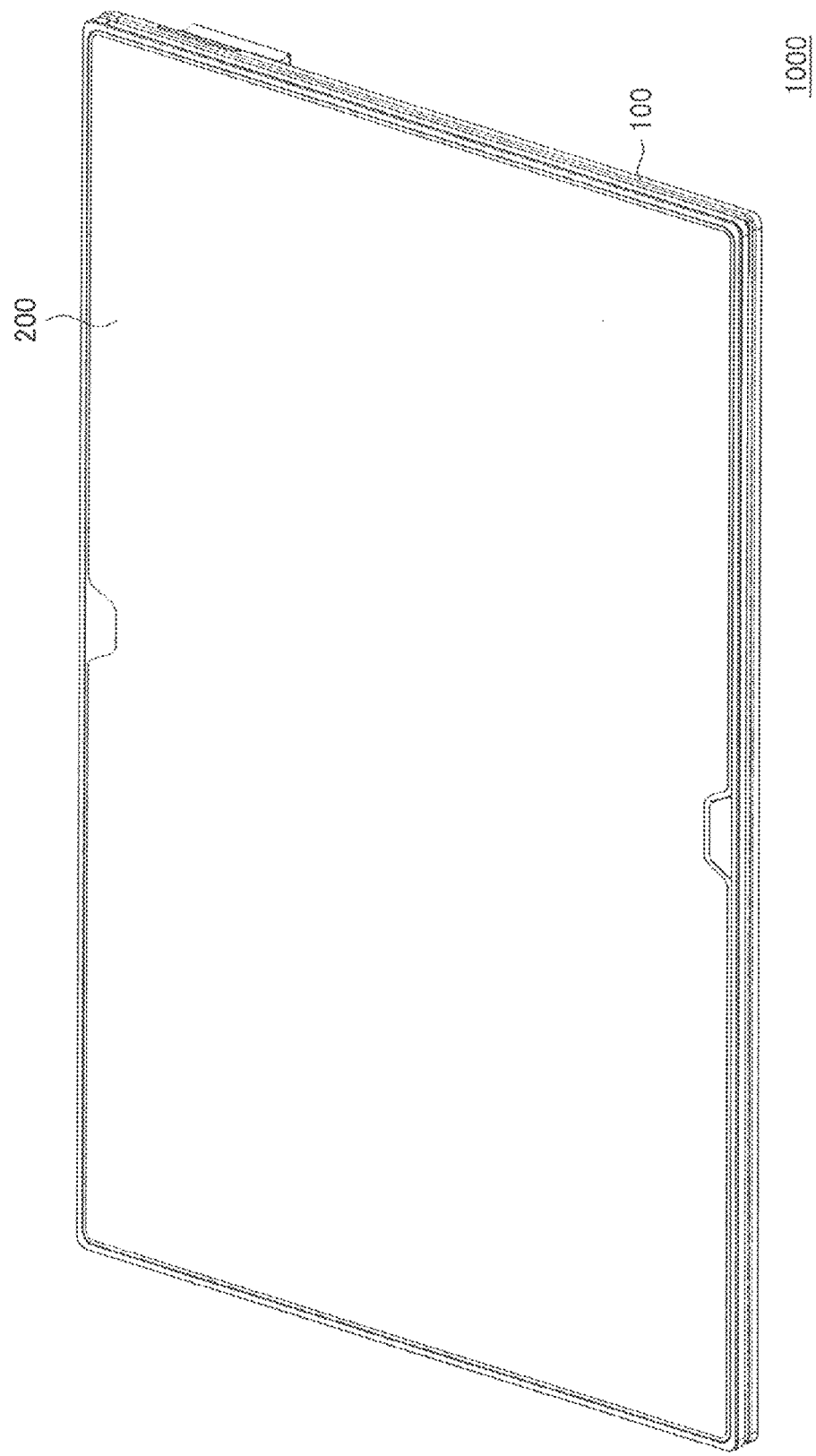
FIG. 1 is a schematic diagram showing a state in which a display unit is superimposed on a main unit.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.
1. Examples of appearance of information processing device
2. Link mechanism among main unit, display unit, and hinge
3. Use of space between display unit and main unit
4. Cooling structure of main unit

[1. Examples of Appearance of Information Processing Device]

Figure 2:
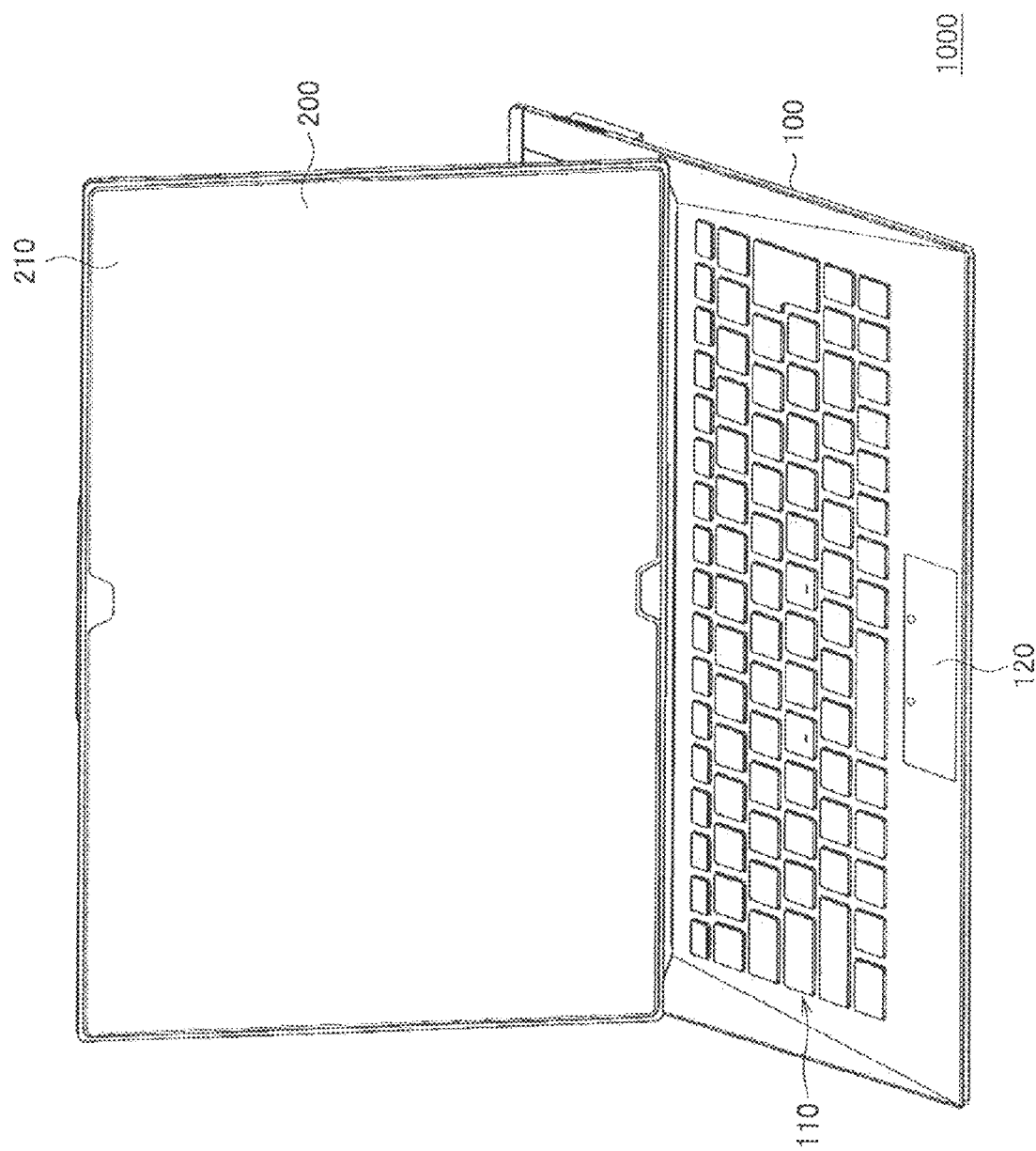
FIG. 2 is a schematic diagram showing a state in which a display unit is slid to stand up with respect to a main unit.
Figure 3:
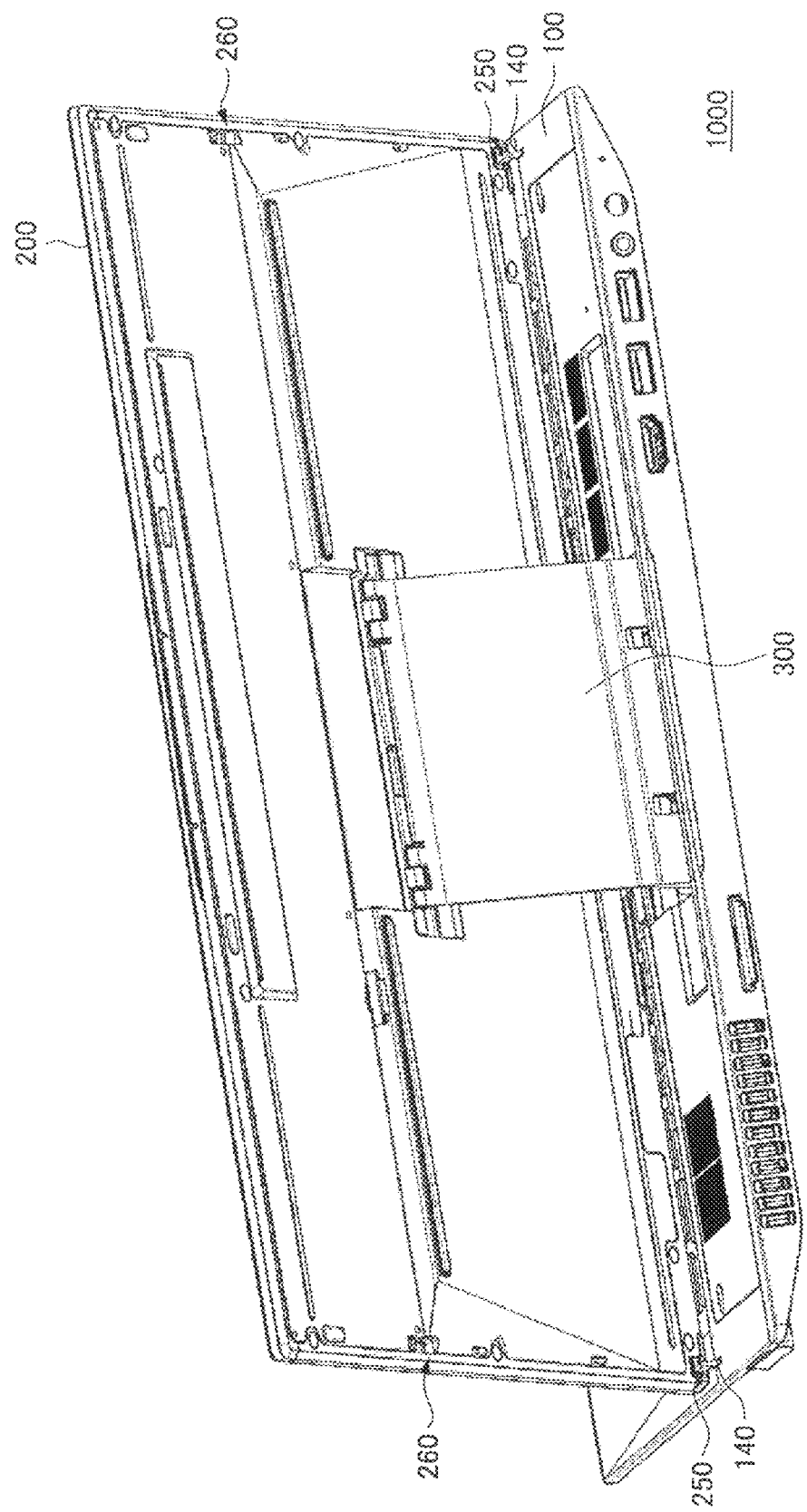
FIG. 3 is a schematic diagram showing a state of an information processing device shown in FIG. 2 when seen from a back side.

First, a schematic structure of an information processing device according to a first embodiment of the present disclosure will be described with reference to FIG. 1 to FIG. 3. FIG. 1 to FIG. 3 are schematic diagrams each showing the appearance of an information processing device (electronic device) 1000. The information processing device 1000 includes a main unit 100 and a display unit 200. A keyboard 110 is provided over the main unit 100. The display unit 200 includes a touch panel 210 in which a touch sensor is provided over a display device such as a LCD.

FIG. 1 shows a state in which the display unit 200 is superimposed on the main unit 100. In this state, a user can perform desired operations by operating the touch panel 210. That is, the user can use the information processing device 1000 as a so-called tablet terminal.

Meanwhile, FIG. 2 shows a state in which the display unit 200 is slid to stand up with respect to the main unit 100. In this state, the user can perform desired operations by operating the keyboard 110. The user can also perform desired operations by operating the touch panel 210 of the display unit 200. Further, the user can also perform desired operations by operating a touch pad 120, which is a pointing device provided in an area in front of the keyboard 110.

FIG. 3 shows a state of the information processing device 1000 shown in FIG. 2 when seen from the back side. As shown in FIG. 3, the main unit 100 and the display unit 200 are connected to each other with a hinge 300. A sliding operation (also referred to as a surf-slide) of the display unit 200 with respect to the main unit 300 with the hinge 300 can mutually move the information processing device 1000 between the state shown in FIG. 1 and the state shown in FIG. 2.

Figure 4:
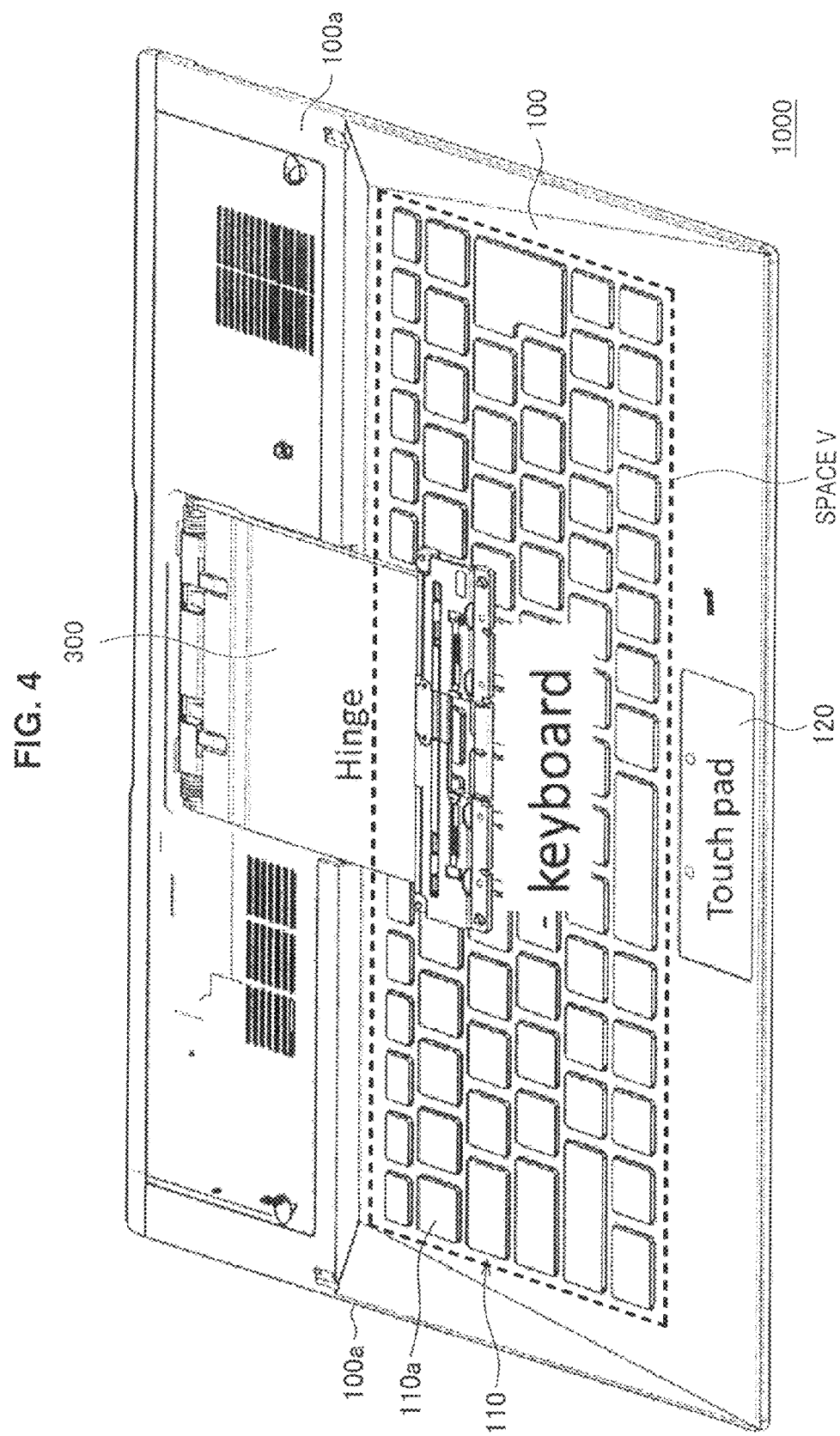
FIG. 4 is a perspective view showing a state in which a display unit is detached from a state shown in FIG. 1.

FIG. 4 is a perspective view showing a state in which the display unit 200 is detached from the state shown in FIG. 1. As shown in FIG. 4, in the state in which the display unit 200 is superimposed on the main unit 100 shown in FIG. 1, a front part of the hinge 300 is superimposed on the keyboard 110. In other words, the hinge 300 extends forward to be superimposed on the keyboard 110, and a sufficient length of the hinge 300 in the front and back direction is secured. This structure enables the display unit 200 to move more backward of the main unit 100 in the state in which the display unit 200 is open (FIG. 2), and accordingly, the tilt angle of the display unit 200 can be large.

[2. Link Mechanism Among Main Unit, Display Unit, and Hinge]

Figure 5:
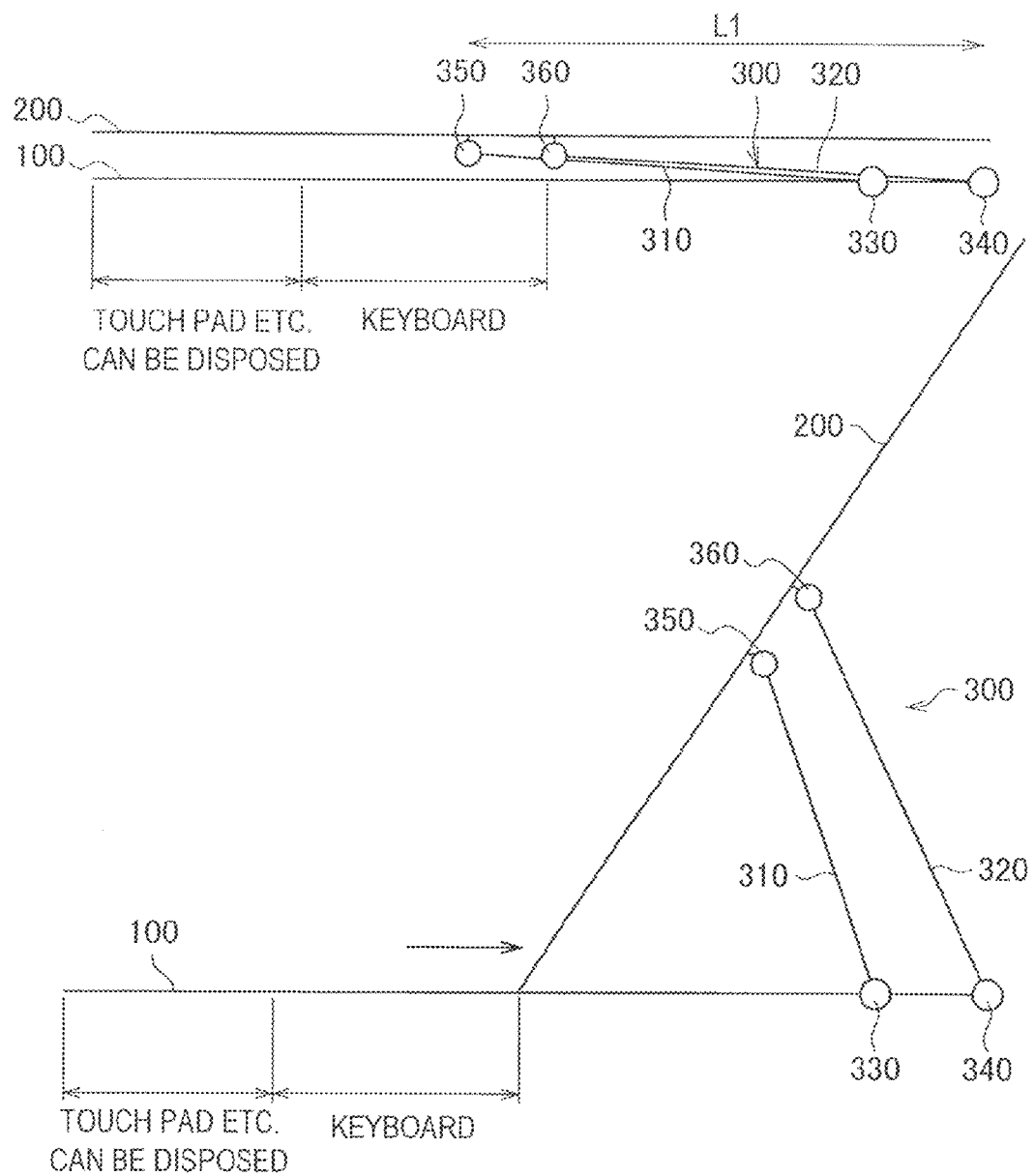
FIG. 5 is a schematic diagram showing a link mechanism among a main unit, a display unit, and a hinge.

FIG. 5 is a schematic diagram showing a link mechanism among the main unit 100, the display unit 200, and the hinge 300. The upper stage and the lower stage in FIG. 5 schematically show the state shown in FIG. 1 and the state shown in FIG. 2, respectively. In the example shown in FIG. 5, a length L1 of the hinge 300 is so long that the hinge 300 is superimposed on the keyboard 110. As shown in FIG. 5, the hinge 300 includes two hinge plates 310 and 320. The main unit 100 is connected to the hinge 300 with two links (nodes) 330 and 340. Further, the main unit 100 is connected to the display unit 200 with two links (nodes) 350 and 360. With such a structure, when the display unit 200 is slid backward of the main unit 100, the display unit 200 can be tilted with respect to the main unit 100.

Figure 6:
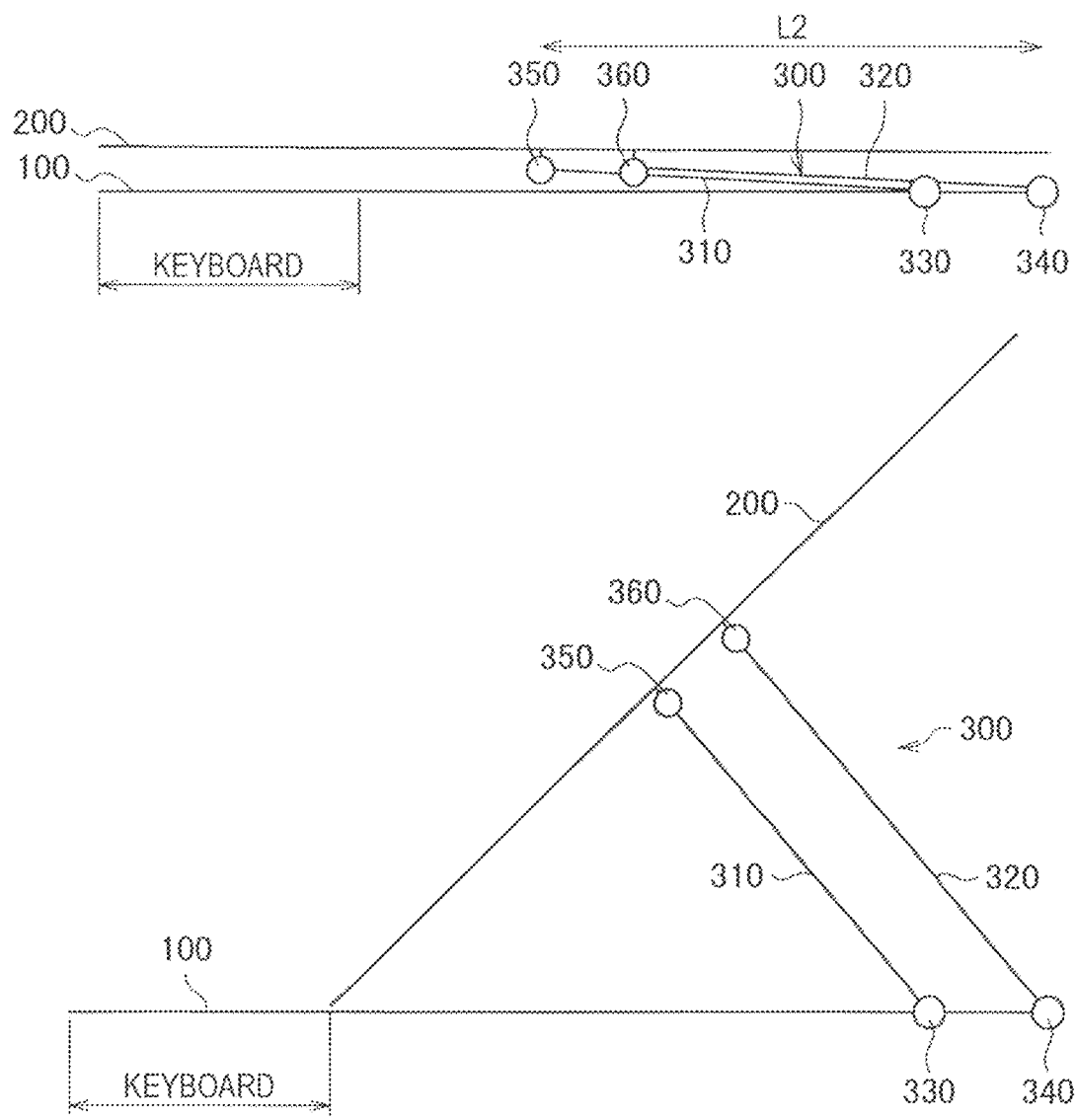
FIG. 6 is a schematic diagram showing an example in which a hinge is not superimposed on a keyboard for comparison with FIG. 5.

For comparison with FIG. 5, FIG. 6 shows an example in which the hinge 300 is not superimposed on the keyboard 110 by making a length L2 of the hinge 300 shorter than the length L1 of the hinge 300 in FIG. 5. In this case, when the display unit 200 is tilted, the short length L2 of the hinge leads to a smaller tilt angle than in the case of FIG. 5, and the display unit 200 faces upward. Thus, the keyboard 110 needs to be disposed more forward of the main unit 100, and there is a limitation on the size of the keyboard 110.

Meanwhile, in this embodiment shown in FIG. 5, by disposing the hinge 300 to be superimposed on the keyboard 110 and making the length L1 of the hinge long enough, the tilt angle can be made large enough. Thus, in the state shown in FIG. 2, the bottom end of the display unit 200 can move more backward of the main unit 100, and the keyboard 110 can be disposed more backward of the main unit 100. Accordingly, it becomes possible to arrange structural elements such as a touch pad, a palm rest, and an NFC device in an area in front of the keyboard 110. Further, by making the tilt angle large, the visibility of the display unit 200 can be increased when the user operates the information processing device 1000 placed on a desk in the state shown in FIG. 2.

Furthermore, with the structure in which the hinge 300 is superimposed on the keyboard 110, the position of the keyboard 110 is not limited by the position of the hinge 300, and an area to be used for the keyboard 110 can be enlarged. Thus, the key pitch can also be increased. Further, with the structure in which the hinge 300 is superimposed on the keyboard 110, an area to be used for the hinge 300 becomes larger and the bottom end of the display unit 200 in the state shown in FIG. 2 can move more backward of the main unit 100. Accordingly, the tilt angle can be larger and the area for the keyboard 110 can be further enlarged. Furthermore, the keyboard 110 can be disposed more backward of the main unit 100. Thus, it is possible to dispose the touch pad 120 in front of the keyboard 110 and to arrange the NFC device, the palm rest, and the like as shown in FIG. 2. In contrast, as shown in FIG. 6, in the structure in which the hinge 300 is not superimposed on the keyboard 110, the keyboard 110 is disposed more forward of the main unit 100, and it is difficult to secure a space for the touch pad 120. Therefore, with the structure in which the hinge 300 is superimposed on the keyboard 110, as shown in this embodiment, it becomes possible to secure an effective space in front of the keyboard 110 and make a structure with a higher added value.

In this embodiment, the single hinge 300 is disposed at one center portion of the main unit 100. In the case where two hinges 300 are disposed at the respective ends of the main unit 100, for example, it is assumed that spaces for the hinges 300 are to be provided at the respective sides of the keyboard 110, and the width of the main unit 100 might increase. Further, it is assumed that depression portions, trenches, or the like are to be formed at portions of the main unit 100 corresponding to the respective sides of the keyboard 110 in order to avoid the hinges. Thus, by disposing the single hinge 300 at the center portion of the main unit 100, it becomes possible to achieve further downsizing of the information processing device 1000 and to simplify the structure of the information processing device 1000 not to damage the appearance.

[3. Use of Space Between Display Unit and Main Unit]

Figure 7:
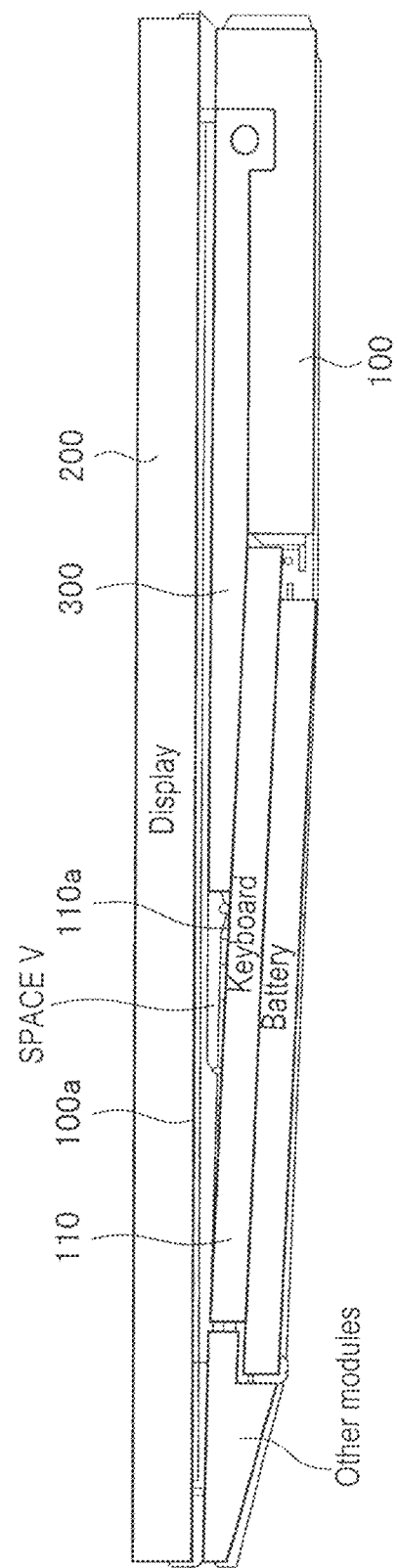
FIG. 7 is a schematic diagram showing a cross section of a center of an information processing device along a front and back direction.

Next, a structure in which the hinge 300 is stored between the main unit 100 and the display unit 200 in the state shown in FIG. 1 will be described. FIG. 7 is a schematic diagram showing a cross section of a center of the information processing device 1000 along the front and back direction. As shown in FIG. 7, the keyboard 110 is disposed such that a top surface 110a of the keyboard 110 has a certain angle with a top surface 100a of the main unit 100 and the top surface 110a of the keyboard 110 is not parallel with the top surface 100a of the main unit 100. Thus, as shown in FIG. 4, a step between the top surface 100a and the top surface 110a of the keyboard 110 becomes larger in a more backward area of the main unit 100. With such a structure, a predetermined space V is formed between the display unit 200 and the keyboard 110, and the hinge 300 is disposed within the space V in the state shown in FIG. 1. Thus, the hinge 300 does not interfere with the keyboard 110 or the display unit 200 and can be stored within the space V.

Figure 8:
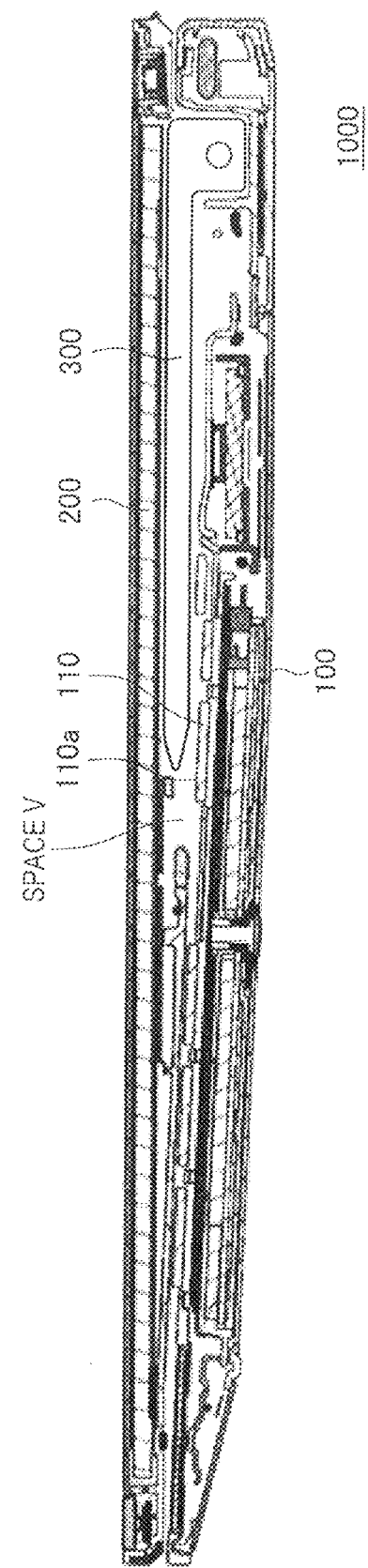
FIG. 8 is a cross-sectional view showing FIG. 7 more specifically.

FIG. 8 is a cross-sectional view showing FIG. 7 more specifically. As shown in FIG. 8, the hinge 300 is disposed within the space V between the keyboard 110 and the display unit 200.

Figure 9:
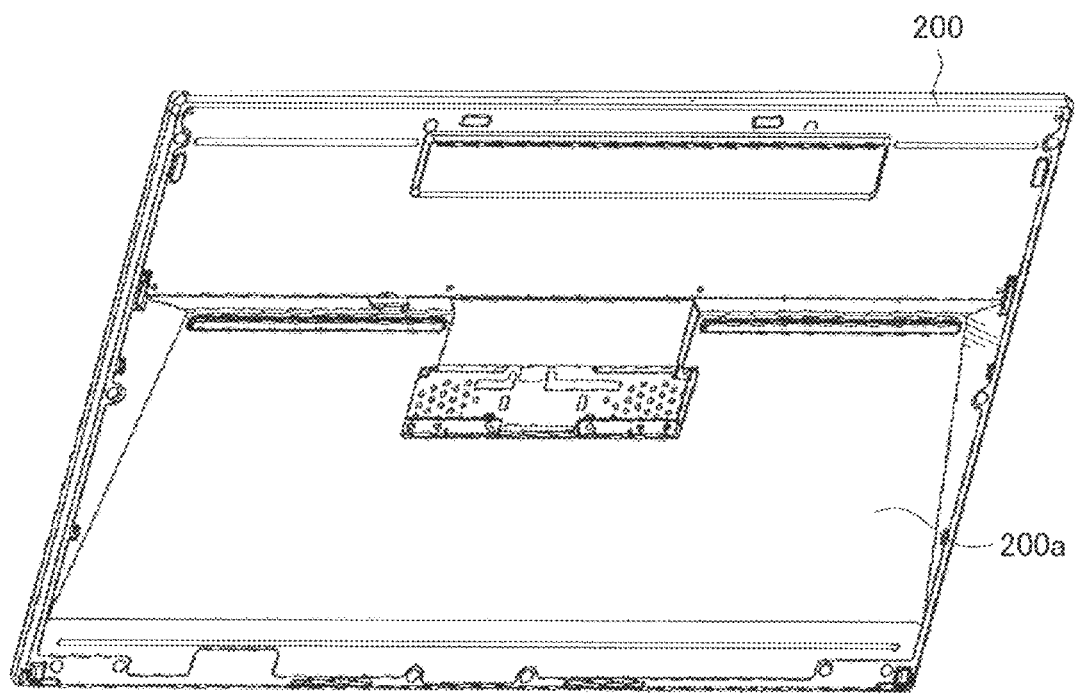
FIG. 9 is a schematic diagram showing a protruding area provided on a rear side of a display unit.

Since the hinge 300 is provided only at the center portion of the main unit 100, the space V exits also at both sides of the hinge 300. In this embodiment, a protrusion (protruding area) 200a which protrudes toward the keyboard 110 is provided on the rear side of the display unit 200 such that the space V at both sides of the hinge 300 is filled with the protrusion 200a. FIG. 9 is a schematic diagram showing the protruding area 200a provided on the rear side of the display unit 200. As shown in FIG. 9, the protrusion 200a is provided on both the left and right of the center of the display unit 200, and the thickness of the display unit 200 becomes larger in a more backward area of the main unit 100 in the state shown in FIG. 1, according to the shape of the space V formed between the display unit 200 and the keyboard 110.

Figure 10:
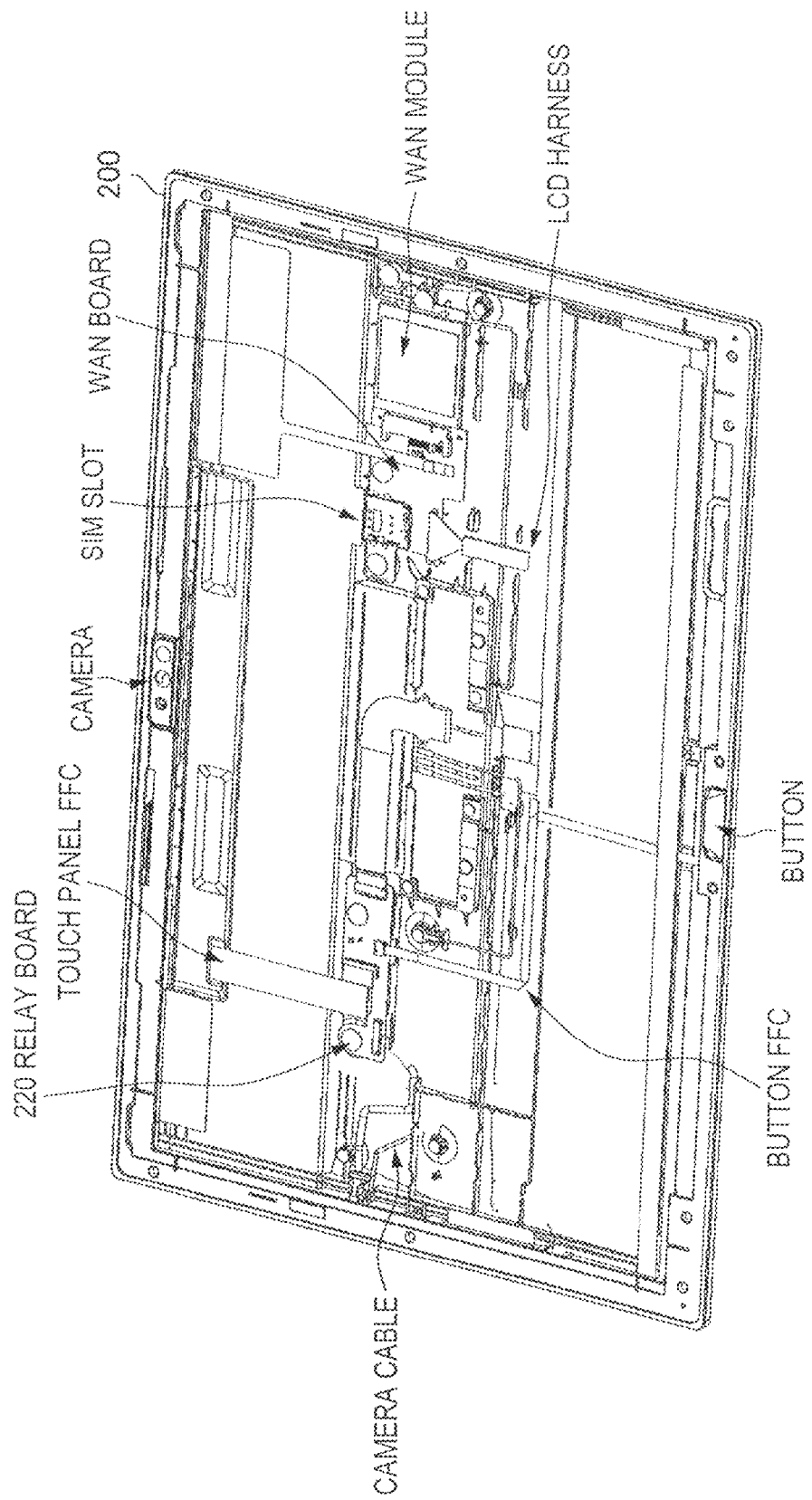
FIG. 10 is a schematic diagram showing an internal structure of a display unit.

With such a structure, a variety of modules can be arranged in the protruding area 200a of the display unit 200. FIG. 10 is a schematic diagram showing an internal structure of the display unit 200. For example, it is possible to dispose, on one side of the protruding area 200a, a relay board 220, which integrates three kinds of signal lines to one, the signal lines being extended from a touch panel board, a camera module, and a button board. On the other side of the protruding area 200a, it is possible to dispose a board on which a WAN module and a SIM slot are mounted. Further, by arranging an LCD harness, an antenna cable, and the like in the protruding area 200a, the space of the protruding area 200a can be used as much as possible.

It is also possible to arrange other modules such as a speaker and a battery in the protruding area 200a. In the case where a speaker is disposed in the protruding area 200a, it is possible to use a very large space compared with a space for the main unit 100, and accordingly, a high sound quality speaker can be disposed therein. Thus, it becomes possible to transmit a sound from a higher position than in the case where the speaker is disposed in the main unit 100 and to enhance the sound quality. In the case where a battery is disposed in the protruding area 200a, the battery capacity can be increased.

In general, a module serving as a source of a noise, such as a motherboard, is disposed in the main unit 100. Thus, it is desirable to arrange a module of a communication system, an antenna, and the like, which are likely to be influenced by a noise, in the protruding area 200a of the display unit 200. In this manner, it becomes possible to prevent the influence of the noise from the main unit 100. In the case where an antenna is disposed, the antenna can be used effectively as a measure against SAR. Further, a near field communication (NFC) device may be mounted on the protruding area 200a.

Figure 11:
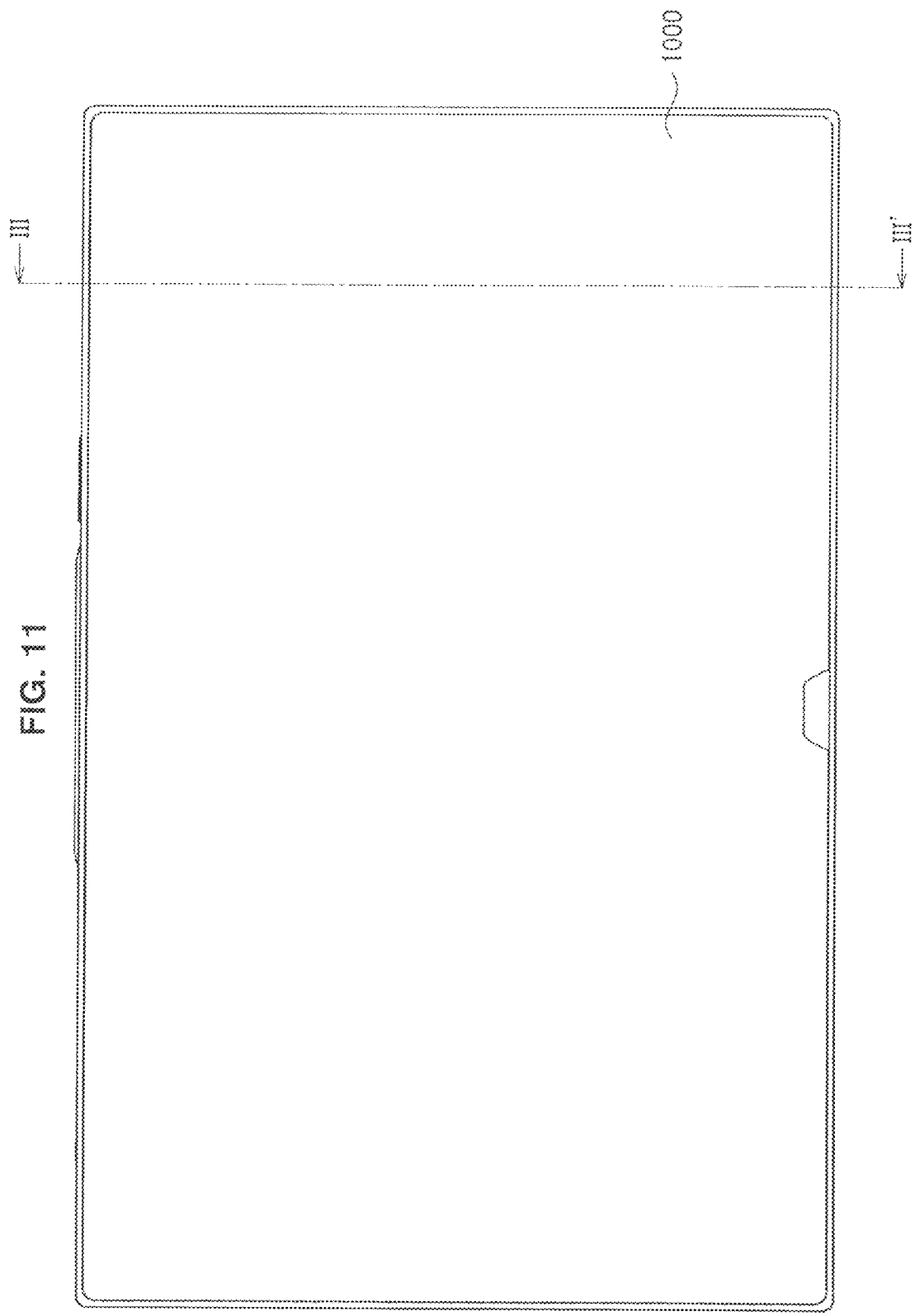
FIG. 11 is a schematic diagram showing an example in which a module is disposed in a protruding area.
Figure 12:
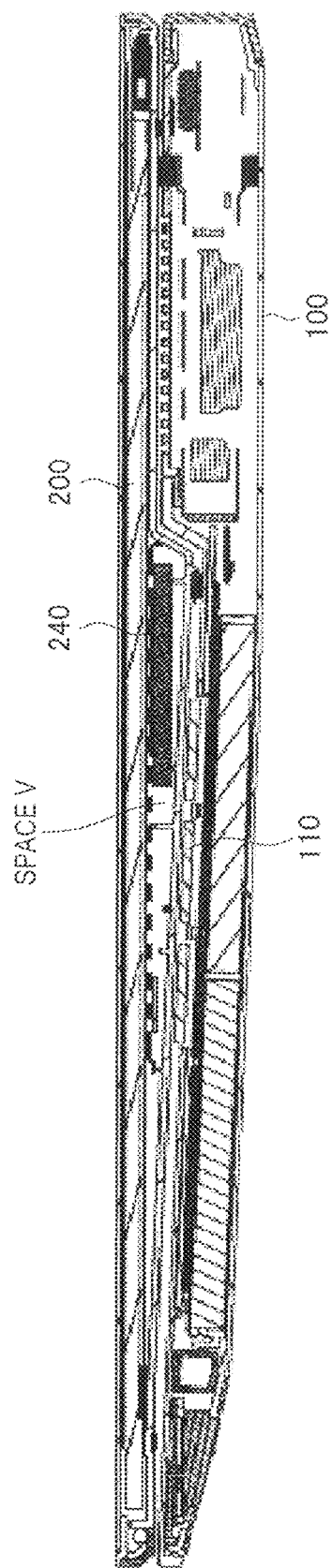
FIG. 12 is a schematic diagram showing an example in which a module is disposed in a protruding area.

FIG. 11 and FIG. 12 are schematic diagrams each showing an example in which modules are arranged in the protruding area 200a. FIG. 11 shows the state in FIG. 1 when seen from the above. FIG. 12 shows a cross section along dotted line III-III' in FIG. 11, the cross section being on the right of the hinge 300. As shown in FIG. 12, a WAN board 240 is disposed as a module in the protruding area 200a on the right of the display unit 200. Other modules may be disposed in a similar manner. Since the width in the up and down direction of the space V becomes larger in a more backward area of the information processing device 1000, it is preferable that a relatively thick module is disposed backward of the information processing device 1000 and a relatively thin module is disposed forward of the information processing device.

In this manner, by disposing the top surface 110a of the keyboard 110 to be inclined to the top surface 100a of the main unit 100, the space V can be provided between the keyboard 110 and the display unit 200, and the hinge 300 can be disposed to be superimposed on the keyboard 110. Further, by providing the space V between the keyboard 110 and the display unit 200, the protruding area 200a can be provided at both sides of the hinge 300. Therefore, by arranging modules in the protruding area 200a, minimization can be achieved by using the space V effectively, and the modules can be arranged without increasing the entire thickness of the information processing device 1000. By arranging, in the display unit 200, the modules that are originally arranged in the main unit 100, useless spaces are eliminated and the downsizing and weight reduction of the information processing device 1000 can be achieved.

[4. Cooling Structure of Main Unit]

Figure 13:
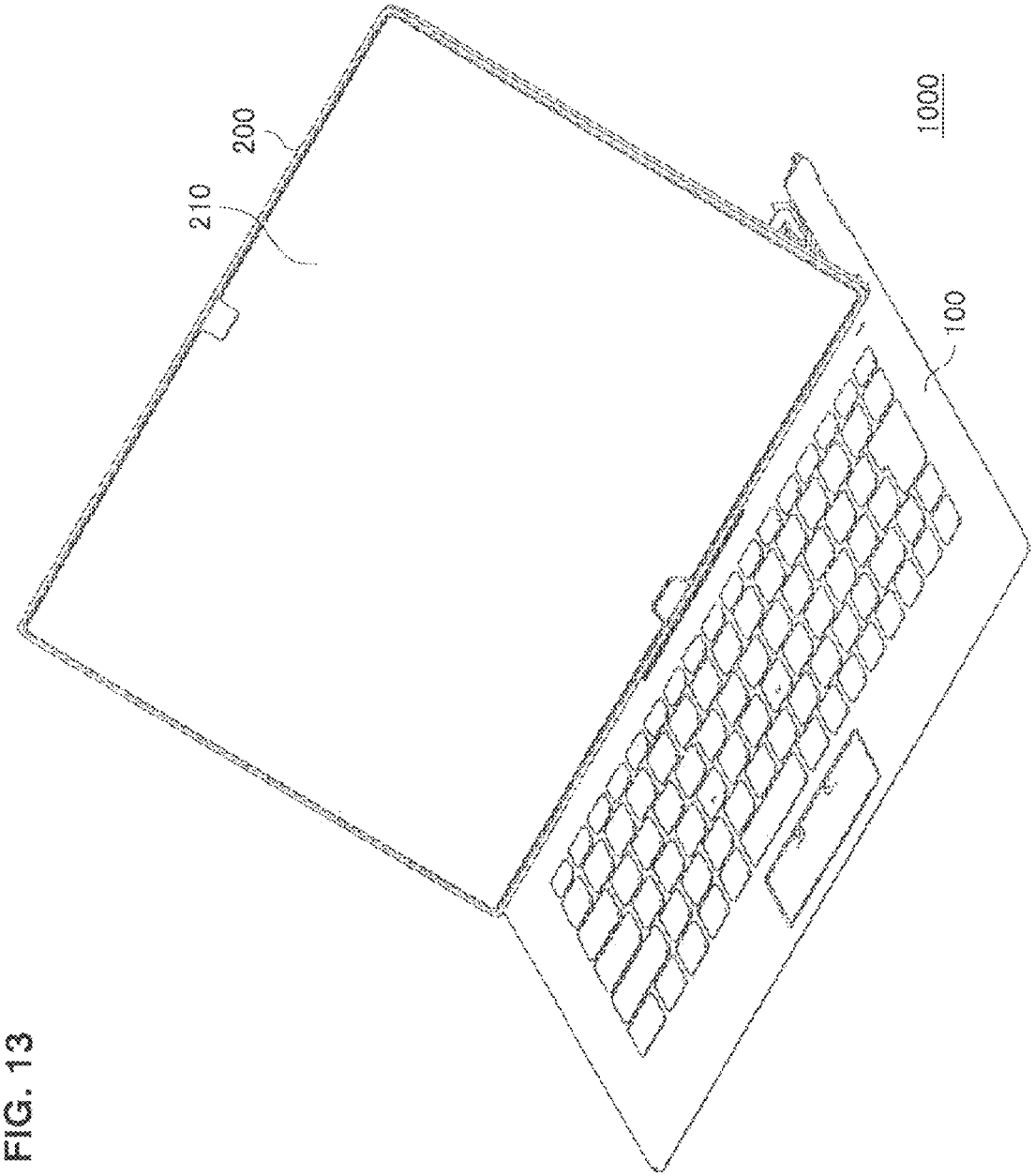
FIG. 13 is a schematic diagram showing an internal structure of an information processing device.
Figure 14:
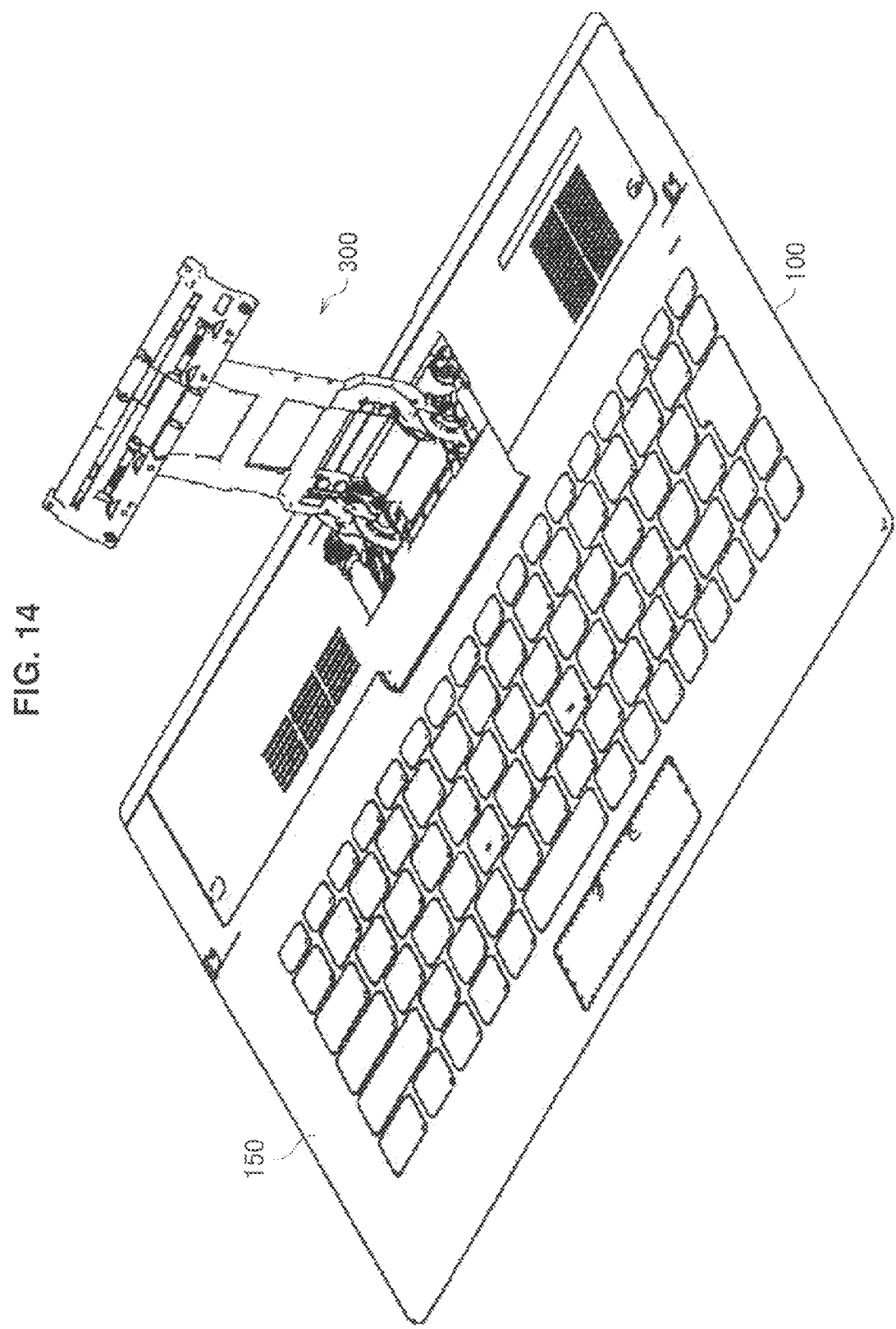
FIG. 14 is a schematic diagram showing an internal structure of an information processing device.
Figure 15:
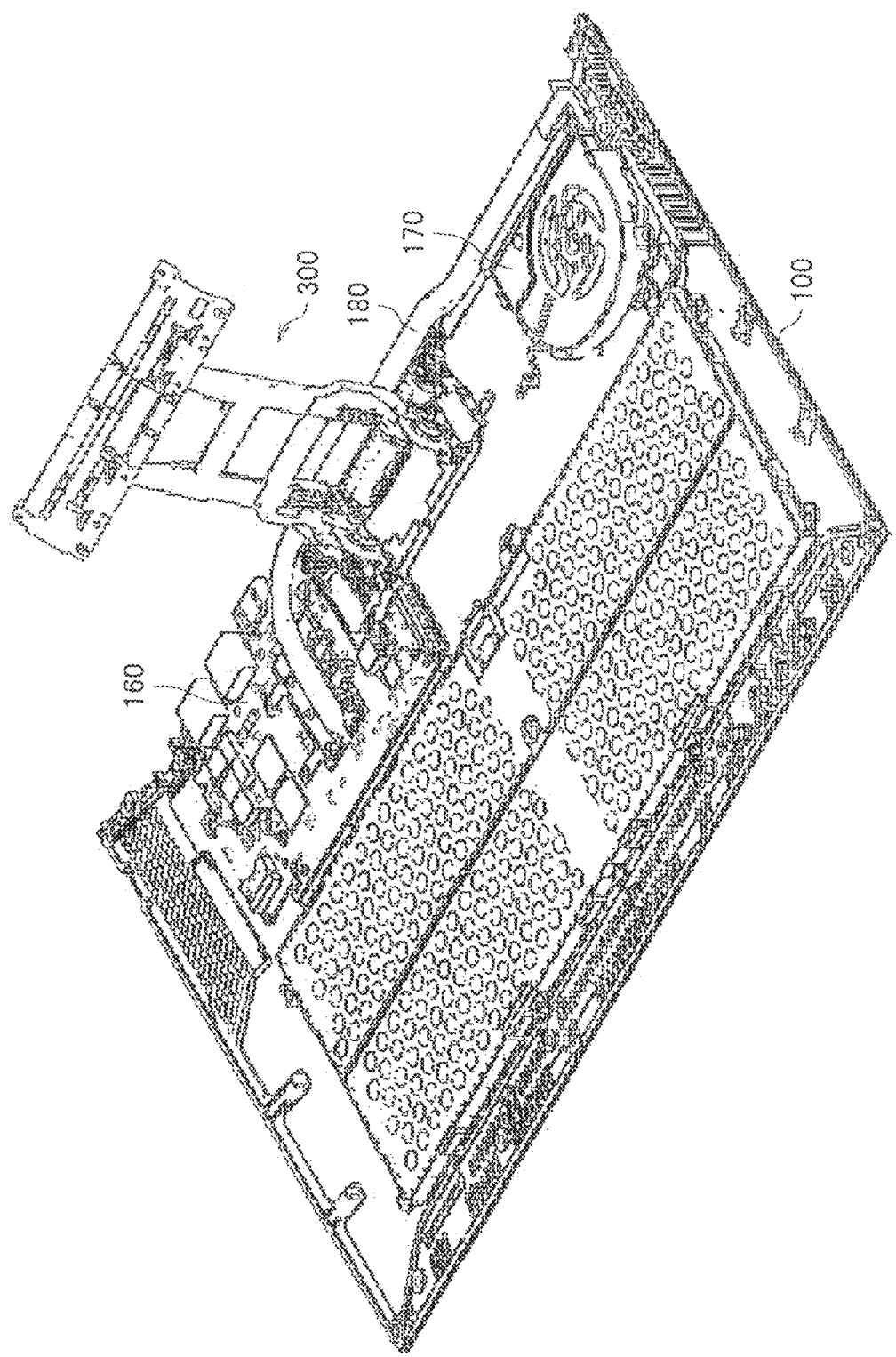
FIG. 15 is a schematic diagram showing an internal structure of an information processing device.

Next, a cooling structure of the main unit 100 will be described. FIG. 13 to FIG. 15 are schematic diagrams each showing the internal structure of the information processing device 1000. FIG. 13 shows a state of completion in which the display unit 200 is attached to the main unit 100. FIG. 14 shows a state in which the display unit 200 is detached from the state shown in FIG. 13. FIG. 15 shows a state in which a top cover 150 of the main unit 100 is further detached from the state shown in FIG. 14.

As shown in FIG. 14 and FIG. 15, the hinge 300 is located at the center of the main unit 100 in the width direction, and is attached to a rear portion (back side) of the main unit 100. As shown in FIG. 15, a motherboard 160 is disposed on the left of the hinge 300. Further, a cooling fan 170 for cooling is disposed on the right of the hinge 300.

A variety of electronic components are arranged over the motherboard 160. Among these electronic components, one end of a heat pipe 180 is connected to an electronic component that has a particularly high heat quantity. The other end of the heat pipe 180 is introduced to an air outlet of the cooling fan 170.

Figure 16:
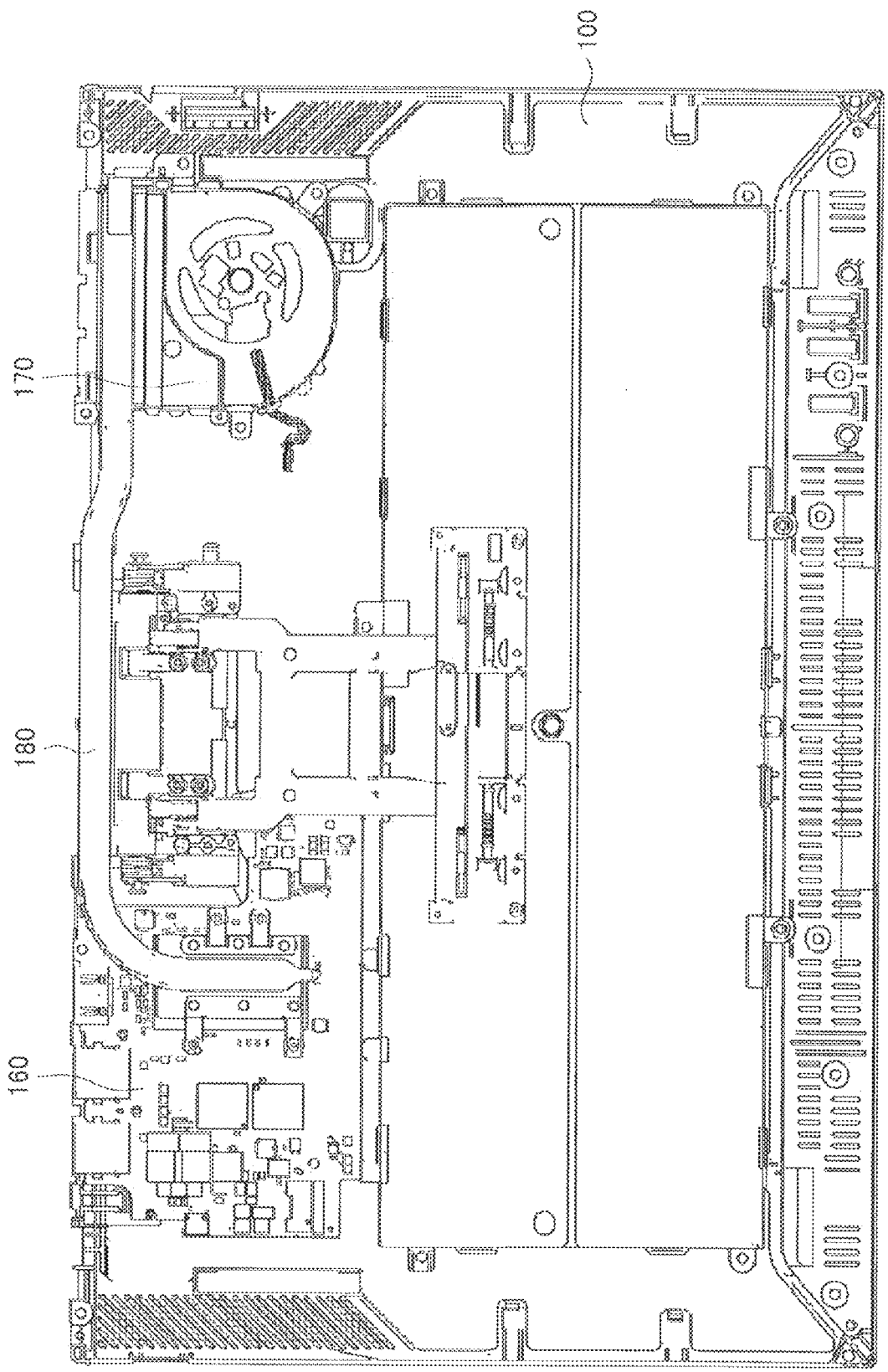
FIG. 16 is a schematic diagram showing a state shown in FIG. 15 when seen from the above of a main unit 100.
Figure 17:
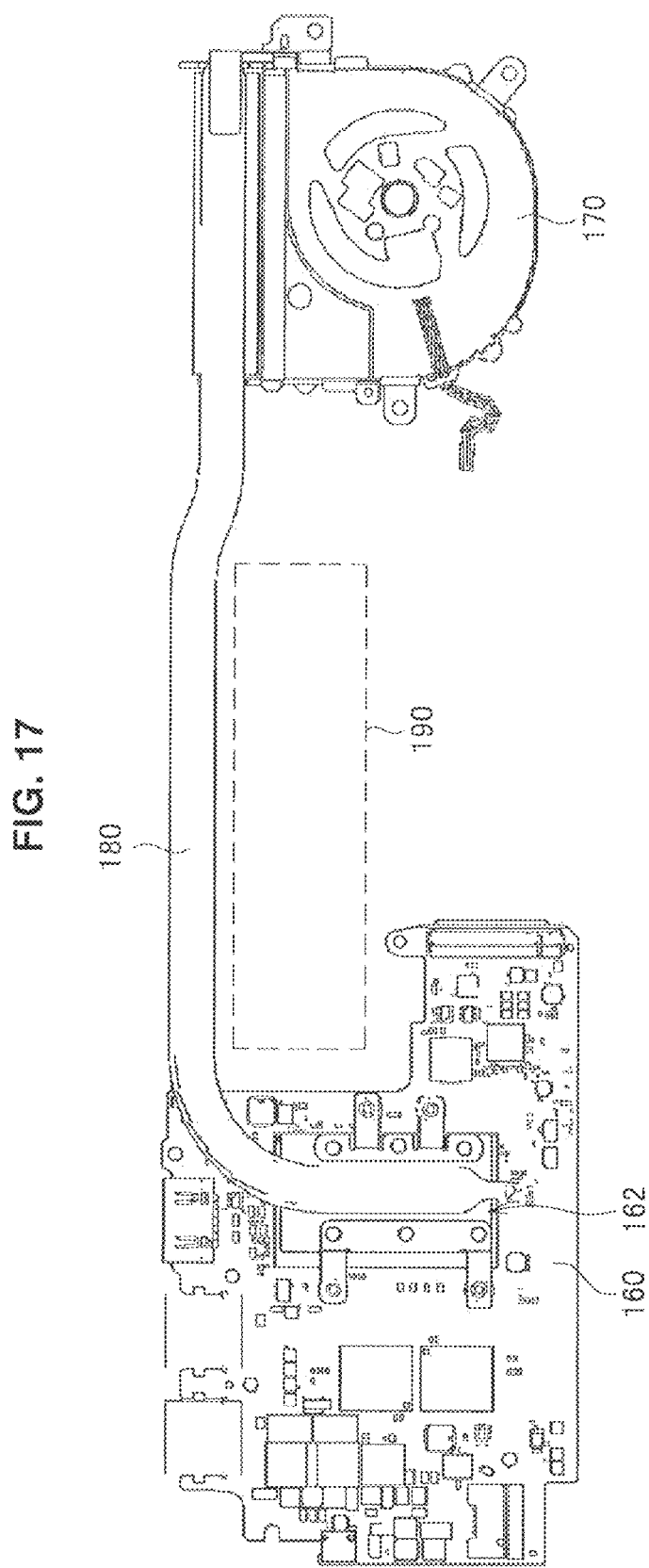
FIG. 17 is a plan view showing structures of a motherboard, a cooling fan, and a heat pipe from among structures shown in FIG. 16.
Figure 18:
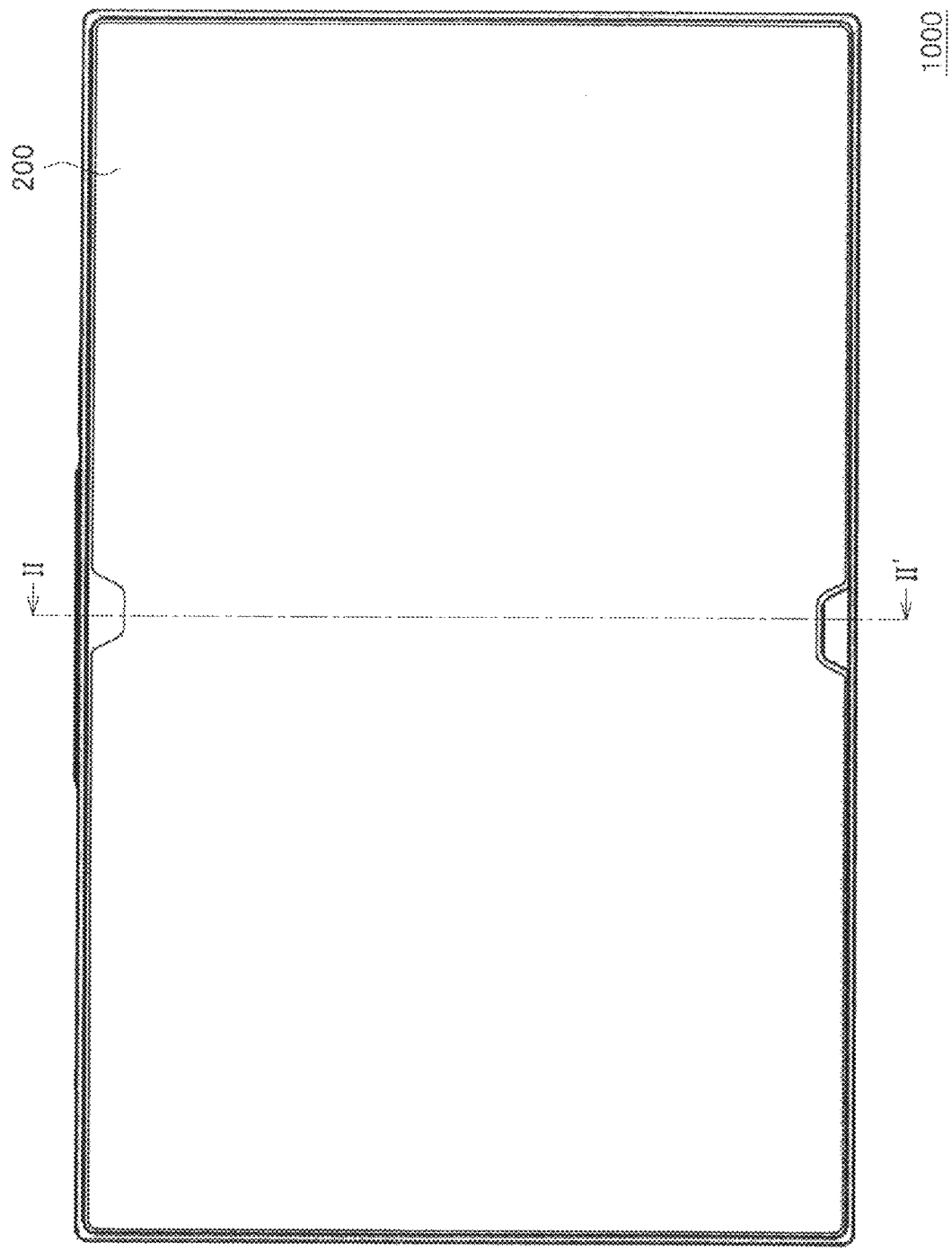
FIG. 18 is a schematic diagram showing a positional relationship between a hinge and a heat pipe.
Figure 19:
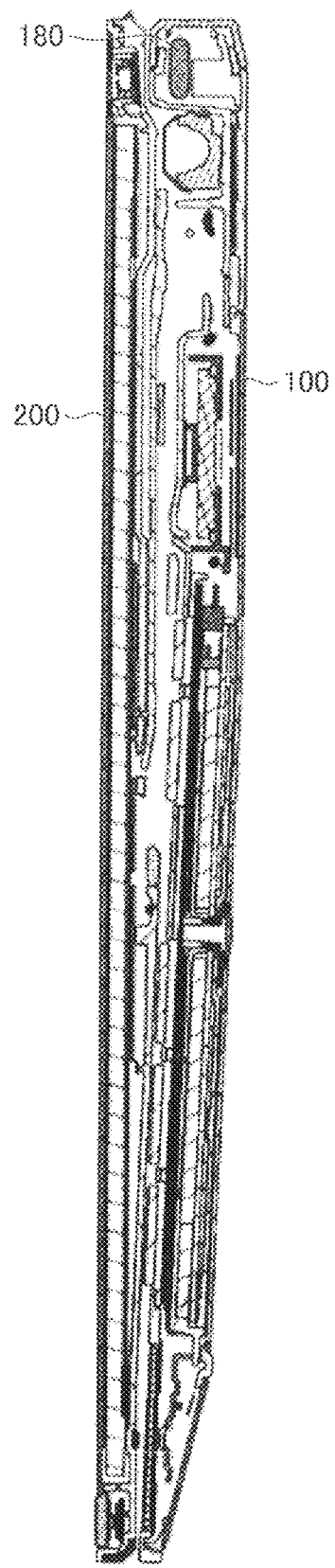
FIG. 19 is a schematic diagram showing a positional relationship between a hinge and a heat pipe.

FIG. 16 is a schematic diagram showing the state shown in FIG. 15 when seen from the above of the main unit 100. In FIG. 16, unlike in FIG. 15, the hinge 300 is folded forward. FIG. 17 is a plan view showing structures of the motherboard 160, the cooling fan 170, and the heat pipe 180 from among the structures shown in FIG. 16. FIG. 18 and FIG. 19 are schematic diagrams each showing a positional relationship between the hinge 300 and the heat pipe. FIG. 18 shows a state of the information processing device 1000 shown in FIG. 1 when seen from the above, and FIG. 19 shows a cross section along dotted line II-II' in FIG. 17. As shown in FIG. 16, FIG. 17, and FIG. 19, the heat pipe 180 is disposed more backward of the main unit 100 than a hinge attaching portion 190 of the hinge 300. In other words, as shown in FIG. 19, the heat pipe 180 passes behind the hinge attaching portion 190 so as to avoid a portion where the hinge 300 is attached to the main unit 100 (the hinge attaching portion 190). Thus, in the structure in which the hinge 300 which connects the main unit 100 and the display unit 200 to each other is provided at the center portion, it becomes possible to surely connect, with the heat pipe 180, the motherboard 160 and the cooling fan 170 which are disposed on the left and right of the hinge 300.

Figure 20:
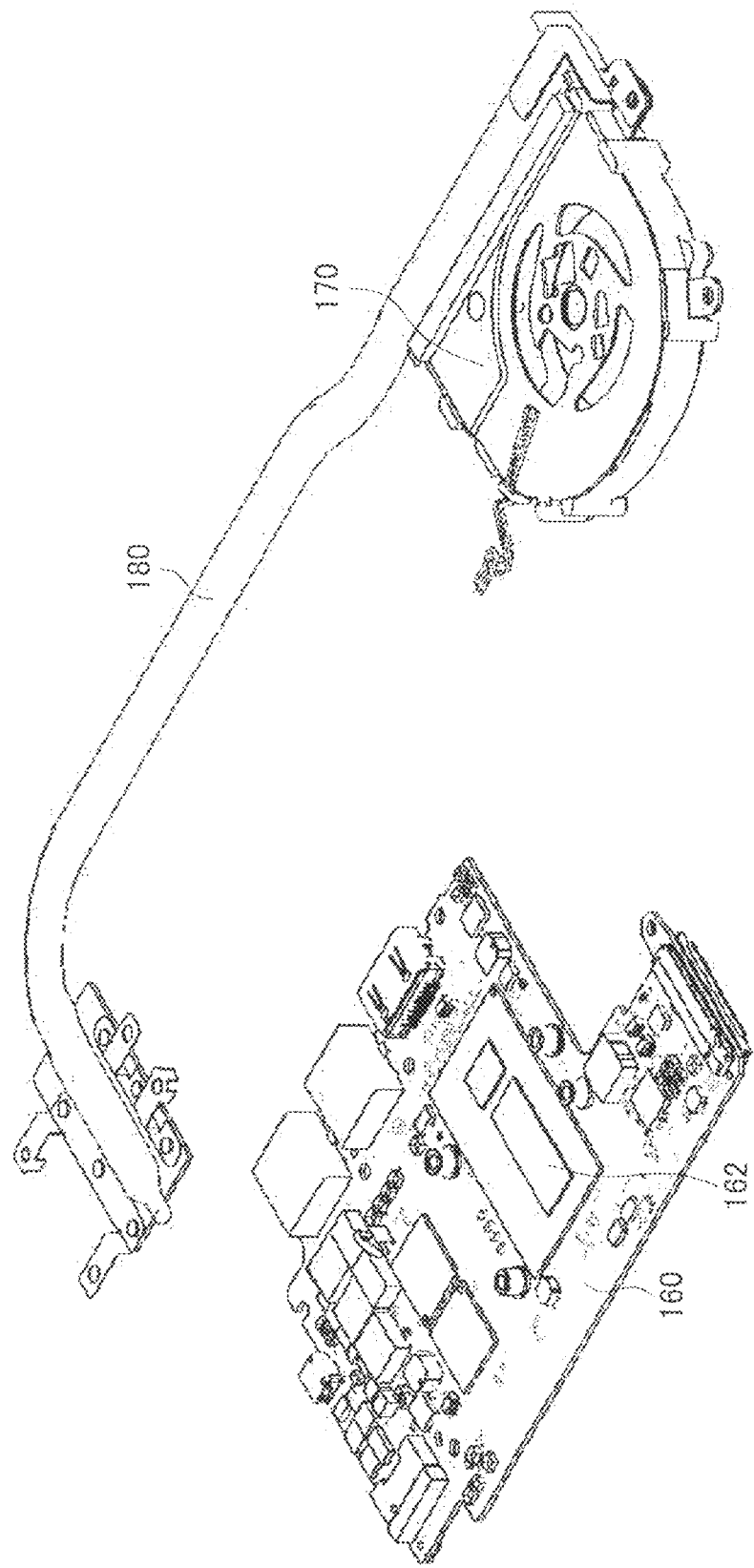
FIG. 20 is a perspective view showing structures of a motherboard, a cooling fan, and a heat pipe.

FIG. 20 is a perspective view showing the structures of the motherboard 160, the cooling fan 170, and the heat pipe 180. As shown in FIG. 20, an end of the heat pipe 180, the end being close to the motherboard 160, is connected to a CPU 162 which is a heat source. Thus, heat generated by the CPU 162 is transferred by the heat pipe 180 to the cooling fan 170 and is then exhausted outside by ventilation from the cooling fan 170. Therefore, it is possible to surely cool the CPU 162 which is away from the cooling fan 170. Further, by setting the position of the heat pipe 180 as appropriate, it becomes possible to set the layout more freely to cool electronic components away from the cooling fan 170.

Figure 21:
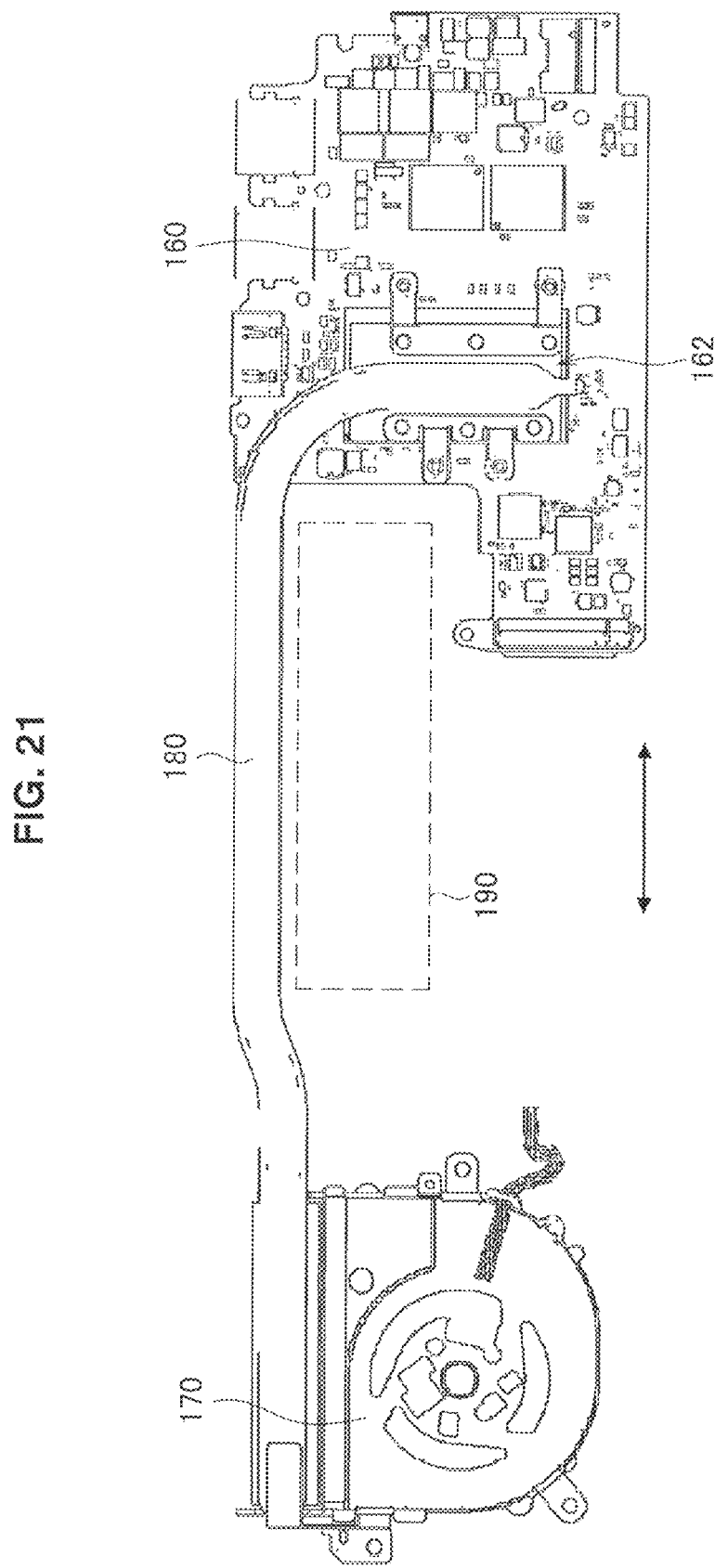
FIG. 21 is a schematic diagram showing an example in which positions of a motherboard and a cooling fan are interchanged in a left and right direction from FIG. 18.
Figure 22:
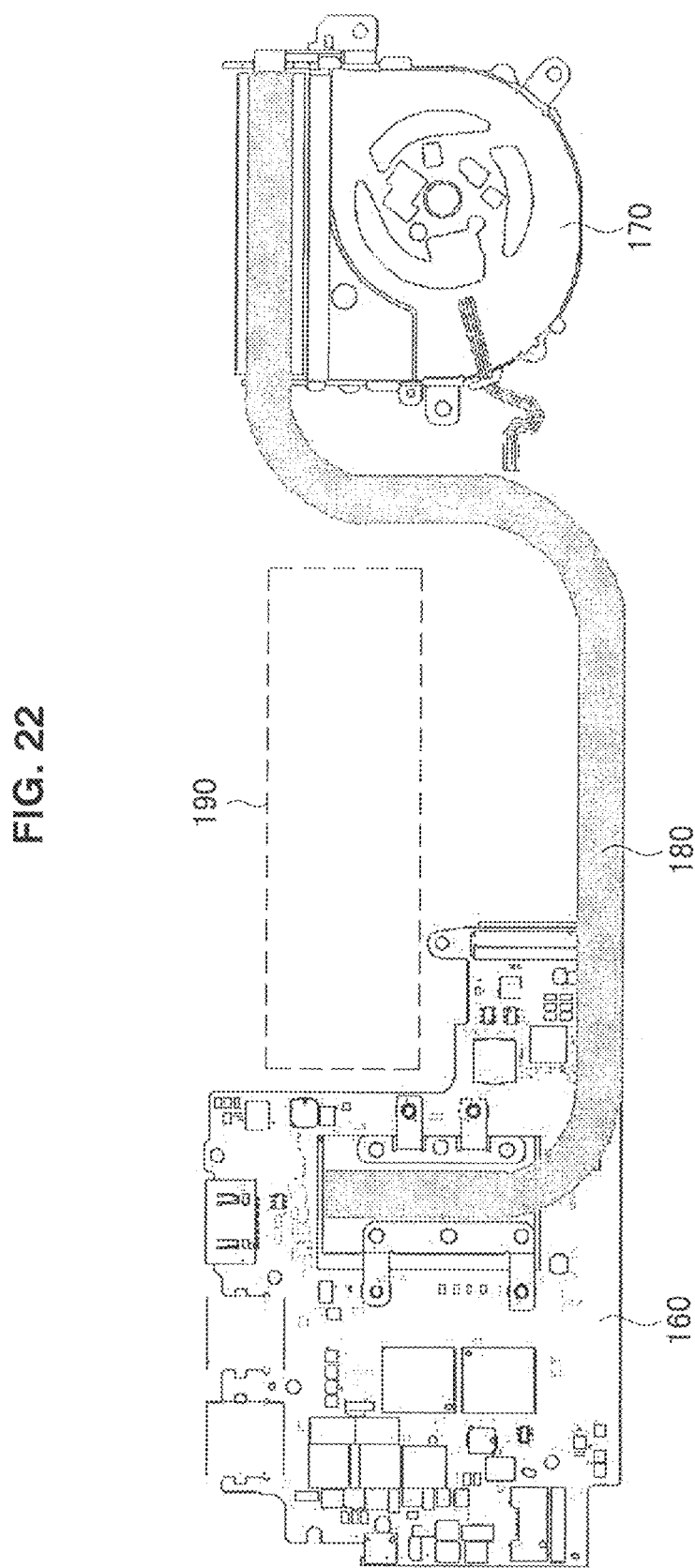
FIG. 22 is a schematic diagram showing an example in which a heat pipe is disposed more forward than a hinge attaching portion unlike in FIG. 18.

FIG. 21 is a schematic diagram showing an example in which positions of the motherboard 160 and the cooling fan 170 are interchanged in the left and right direction from FIG. 18. FIG. 22 is a schematic diagram showing an example in which the heat pipe 180 is disposed more forward than the hinge attaching portion 190 unlike in FIG. 18. As shown in FIG. 21, the heat pipe 180 which connects the left and right of the hinge 300 at least avoids the hinge attaching portion 190 and may pass in front of or behind the hinge attaching portion 190.

In the electronic device 1000, heavy modules are mounted backward, rather than forward, of the main unit 100. Thus, in the state shown in FIG. 1, in the case where the user uses the electronic device 1000 as a so-called tablet terminal, the user holds a heavier part on a back side of the main unit 100 with one hand. In this case, if the user is right-handed, the user holds the heavier part on the back side of the main unit 100 with the left hand. Considering this, as shown in FIG. 14 and FIG. 15, by disposing the cooling fan 170 on a right and backward portion of the main unit 100, the user's hand holding the electronic device 1000 would not overlap with the air outlet of the cooling fan 170. Therefore, it is desirable that the cooling fan 170 is provided on the right side of the main unit 100 when seen from the front.

As described above, according to this embodiment, in the structure in which the single hinge 300 which connects the main unit 100 and the display unit 200 to each other at the center portion of the information processing device 1000, the motherboard 160 having the heat source is disposed on one side of the hinge 300 and the cooling fan 170 is disposed on the other side of the hinge. Further, the heat pipe 180 is disposed so as to avoid the hinge attaching portion 190 where the hinge 300 is attached to the main unit 100, one end of the heat pipe 180 is connected to the heat source of the motherboard 160, and the other end of the heat pipe 180 is connected to the cooling fan 170. Thus, in the structure in which the hinge 300 which connects the main unit 100 and the display unit 200 to each other is provided at the center portion of the information processing device 1000, even in the case where the positions of the heat source and the cooling fan 170 are interchanged with respect to the hinge 300, the heat source can be surely cooled. Therefore, a heat source away from the cooling fan 170 can be efficiently cooled, and the layout of the main unit 100 can be set more freely. Further, it becomes possible to achieve cooling by avoiding obstacles (the hinge attaching portion 190) existing in the main unit 100.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An electronic device including:
a flat-plate-like main unit including a keyboard;
a flat-plate-like display unit which includes a display surface and is configured to move between a first state to be superimposed on the main unit and a second state to stand up from the first state;
a hinge which connects the main unit and the display unit to each other in a manner that the display unit is movable with respect to the main unit, the hinge being provided in a center of the main unit in a left and right direction;
a heat source and a cooling fan across the hinge in an inside of the main unit; and
a heat pipe which connects the heat source and the cooling fan to each other and avoids an attaching portion of the hinge with respect to the main unit.
(2) The electronic device according to (1), wherein the heat pipe is disposed more backward of the main unit than the attaching portion of the hinge, when seen from a front of the main unit.
(3) The electronic device according to (1), wherein the heat pipe is disposed more forward of the main unit than the attaching portion of the hinge, when seen from a front of the main unit.
(4) The electronic device according to (1), wherein the cooling fan is provided at a position that does not overlap with a position of a hand of a user holding the electronic device.
(5) The electronic device according to (4), wherein the cooling fan is disposed at a right and backward position of the main unit, when seen from a front of the main unit.

What is claimed is:
1. An electronic device comprising:
a flat-plate-like main body including a keyboard;
a flat-plate-like display body which includes a display surface and is configured to move between a first state to be superimposed on the main body and a second state to stand up from the first state;
a hinge which connects the main body and the display body to each other in a manner that the display body is movable with respect to the main body, the hinge being provided in a center of the main body in a left and right direction;

a heat source and a cooling fan across the hinge in an inside of the main body, the heat source being provided in one side of the hinge in the left and right direction, when seen from a front of the main body, and the cooling fan being provided in another side of the hinge in the left and right direction, when seen from the front of the main body; and a heat pipe which connects the heat source and the cooling fan to each other and avoids an attaching portion of the hinge with respect to the main body, wherein at least a portion of the heat pipe is disposed more backward than the attaching portion of the hinge, when seen from the front of the main body.

2. The electronic device according to claim 1, wherein the cooling fan is provided at a position that does not overlap with a position of a hand of a user holding the electronic device.

3. The electronic device according to claim 2, wherein the cooling fan is disposed at a right and backward position of the main body, when seen from a front of the main body.

4. The electronic device according to claim 1, wherein the heat pipe passes behind the attaching portion of the hinge, when seen from the front of the main body, from the one side of the hinge to the another side of the hinge so as to avoid the attaching portion of the hinge.

* * * * *